US012772039B2

(12) United States Patent
Hermann et al.

(10) Patent No.: US 12,772,039 B2
(45) Date of Patent: Oct. 20, 2026

(54) SYSTEMS AND METHODS FOR ENABLING PORTABILITY OF VEHICLE FEATURE SUBSCRIPTIONS

(71) Applicant: Ford Global Technologies, LLC, Dearborn, MI (US)

(72) Inventors: Thomas Joseph Hermann, Troy, MI (US); Keith Weston, Canton, MI (US); Brendan Diamond, Naples, FL (US)

( * ) Notice: Subject to any disclaimer, the term of this patent is extended or adjusted under 35 U.S.C. 154(b) by 10 days.

(21) Appl. No.: 19/014,369

(22) Filed: Jan. 9, 2025

(65) Prior Publication Data

US 2026/0197627 A1 Jul. 9, 2026

(51) Int. Cl.

*H04W 8/18* (2009.01)
*B60W 40/08* (2012.01)
*H04L 67/125* (2022.01)

(52) U.S. Cl.

CPC ............ *H04W 8/183* (2013.01); *B60W 40/08* (2013.01); *H04L 67/125* (2013.01); *B60W 2040/0809* (2013.01); *B60W 2040/0881* (2013.01)

(58) Field of Classification Search

CPC ................. H04W 8/183; B60W 40/08; B60W 2040/0809; B60W 2040/0881; H04L 67/125

See application file for complete search history.

(56) References Cited

U.S. PATENT DOCUMENTS

| | | | |
|---|---|---|---|
| 10,293,787 B2 | 5/2019 | Brombach et al. | |
| 10,377,345 B1 * | 8/2019 | Oesterling | H04W 4/80 |
| 11,409,513 B2 | 8/2022 | Hibri et al. | |
| 2007/0271194 A1 | 11/2007 | Walker et al. | |
| 2009/0132316 A1 | 5/2009 | Florance et al. | |
| 2012/0101883 A1 | 4/2012 | Akhter et al. | |
| 2013/0297403 A1 | 11/2013 | Manning | |
| 2015/0244534 A1 | 8/2015 | Amodeo et al. | |
| 2017/0277191 A1 * | 9/2017 | Fairfield | G05D 1/0212 |
| 2021/0297270 A1 | 9/2021 | Bauer et al. | |
| 2021/0374623 A1 * | 12/2021 | Dyer | G06Q 10/025 |

(Continued)

FOREIGN PATENT DOCUMENTS

| | | |
|---|---|---|
| KR | 101703381 B1 | 2/2017 |
| WO | 2023250033 A1 | 12/2023 |

OTHER PUBLICATIONS

Virginia Law, “Regulation of Passenger Carriers”, law.lis.virginia.gov (Year: 2022).*

(Continued)

*Primary Examiner* — Hitesh Patel
*Assistant Examiner* — Shien Ming Chou
(74) *Attorney, Agent, or Firm* — Frank Lollo; Eversheds Sutherland (US) LLP

(57) ABSTRACT

A vehicle including a sensor unit and a processor is disclosed. The sensor unit may detect a presence of a first user in the vehicle. The processor may determine that the first user is present in the vehicle based on inputs obtained from the sensor unit. The processor may further obtain information associated with a subscription for a vehicle feature owned by the first user or lent to the first user by a second user, responsive to determining that the first user is present in the vehicle. The processor may additionally change an operational state of the vehicle feature from an inaccessible state to an accessible state based on the information.

20 Claims, 5 Drawing Sheets

(56) References Cited

U.S. PATENT DOCUMENTS

| | | | | |
|---|---|---|---|---|
| 2022/0261853 | A1 | 8/2022 | Publicover et al. | |
| 2022/0303381 | A1 | 9/2022 | Phillips et al. | |
| 2023/0382391 | A1 | 11/2023 | Roberts et al. | |
| 2024/0039924 | A1 | 2/2024 | Simons | |
| 2025/0168234 | A1* | 5/2025 | Sharma | G06F 13/36 |

OTHER PUBLICATIONS

Silva Livery, "Limousine and Luxury Car Service", www.silvalivery.com (Year: 2024).*

Waymo Team, "Expanding our Waymo One fleet with Greely's all-electric vehicle designed for riders first", https://waymo.com/blog/2021/12/expanding-our-waymo-one-fleet-with/ (Year: 2021).*

Waymo Team, "Waymo and Fiat Chrysler Automobiles (FCA) expand autonomous driving technology partnership", https://waymo.com/blog/2020/07/waymo-and-fiat-chrysler-automobiles-fca-expand-partnership/ (Year: 2020).*

Urwin "28 self-driving car companies you should know", https://builtin.com/articles/self-driving-car-companies (Year: 2024).*

Felipe, "Unified Checkout Streamlining Uber's Payment Ecosystem" Uber Blog, https://www.uber.com/us/en/blog/unified-checkout/ ( Year: 2024).*

GreenAndOrFrog Youtube Music Premium, Redit.com, https://www.reddit.com/r/YoutubeMusic/comments/hu011a/youtube_music_limit_1_streaming_device_is_ruining/ (Year: 2020).*

FordPass, Fordpass Terms and Privacy Policy, https://www.fordpass.com/content/ford_com/fp_app/en_us/termsprivacy.html, Oct. 2024, p. 1-53.

Stephen Edelstein, Ford Secures Spotify Partnership for Its Fordpass Mobility Service, https://www.digitaltrends.com/cars/ford-adds-spotify-to-fordpass, Mar. 22, 2016, p. 1-8.

Jyrki T. J. Penttinen, Wireless Communications Security: Solutions for the Internet of Things, https://ieeexplore.ieee.org/book/8040112, 2015, Abstract.

Peter Ries, NetSuite for Consultants: Your comprehensive guide to becoming a successful NetSuite consultant in 2023, https://ieeexplore.ieee.org/document/10251267, 2023, Abstract.

Longling Geng, et al., Evaluation of Smart Home Systems and Novel UV-Oriented Solution for Integration, Resilience, Inclusiveness & Sustainability,https://ieeexplore.ieee.org/document/10185519?source=IQplus, Oct. 22-25, 2022, Abstract.

Dominique Paret, et al., Autonomous and Connected Vehicles: Network Architectures from Legacy Networks to Automotive Ethernet, https://ieeexplore.ieee.org/book/9770851, 2022, Abstract.

Daniel Minoli, Internet of Things Application Examples, https://ieeexplore.ieee.org/document/8044687?arnumber=8044687&source=IQplus, 2013, Abstract.

Charles P. Bourne, et al., Building the Online Industry: Behind the Scenes, https://ieeexplore.ieee.org/document/6281775, 2003, Abstract.

Bob Williams, Automated Vehicles and MaaS: Removing the Barriers, https://ieeexplore.ieee.org/book/9466288, 2021, Abstract.

Bob McQueen, et al., Smart Mobility Progress Around the World, https://ieeexplore.ieee.org/document/10619945?arnumber=10619945&source=IQplus, 2024, Abstract.

Amirsaman Mahdavian, et al., Drivers and Barriers to Implementation of Connected, Automated, Shared, and Electric Vehicles: An Agenda for Future Research, https://ieeexplore.ieee.org/document/9343324?source=IQplus, 2021, Abstract.

Chris Seferlis, Practical Guide to Azure Cognitive Services: Leverage the power of Azure OpenAI to optimize operations, reduce costs, and deliver cutting-edge AI solutions, https://ieeexplore.ieee.org/document/10251363, 2023, Abstract.

* cited by examiner

SYSTEMS AND METHODS FOR ENABLING PORTABILITY OF VEHICLE FEATURE SUBSCRIPTIONS

FIELD

The present disclosure relates to systems and methods for enabling portability of vehicle feature subscriptions across personal and commercial vehicles.

BACKGROUND

Modern vehicles provide a plurality of features to users to enhance their driving and vehicle usage experience. Examples of such features include Advanced Driver Assistance System (ADAS), navigation assistance system, vehicle-to-vehicle (V2V) communication, airbags, and/or the like. There are additional "premium" features that the users can purchase from the vehicle manufacturer or dealer on subscription. Such premium features are typically made accessible in the vehicle after the user purchases the subscription.

As an example, the user may purchase a subscription for vehicle's autonomous hands-free driving feature or remote parking assist feature for a predefined time duration (e.g., 1 year, 3 years, 7 years, etc.). In this case, the vehicle may enable the user to use the autonomous hands-free driving feature or the remote parking assist feature for the predefined time duration, after the user purchases the subscription.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
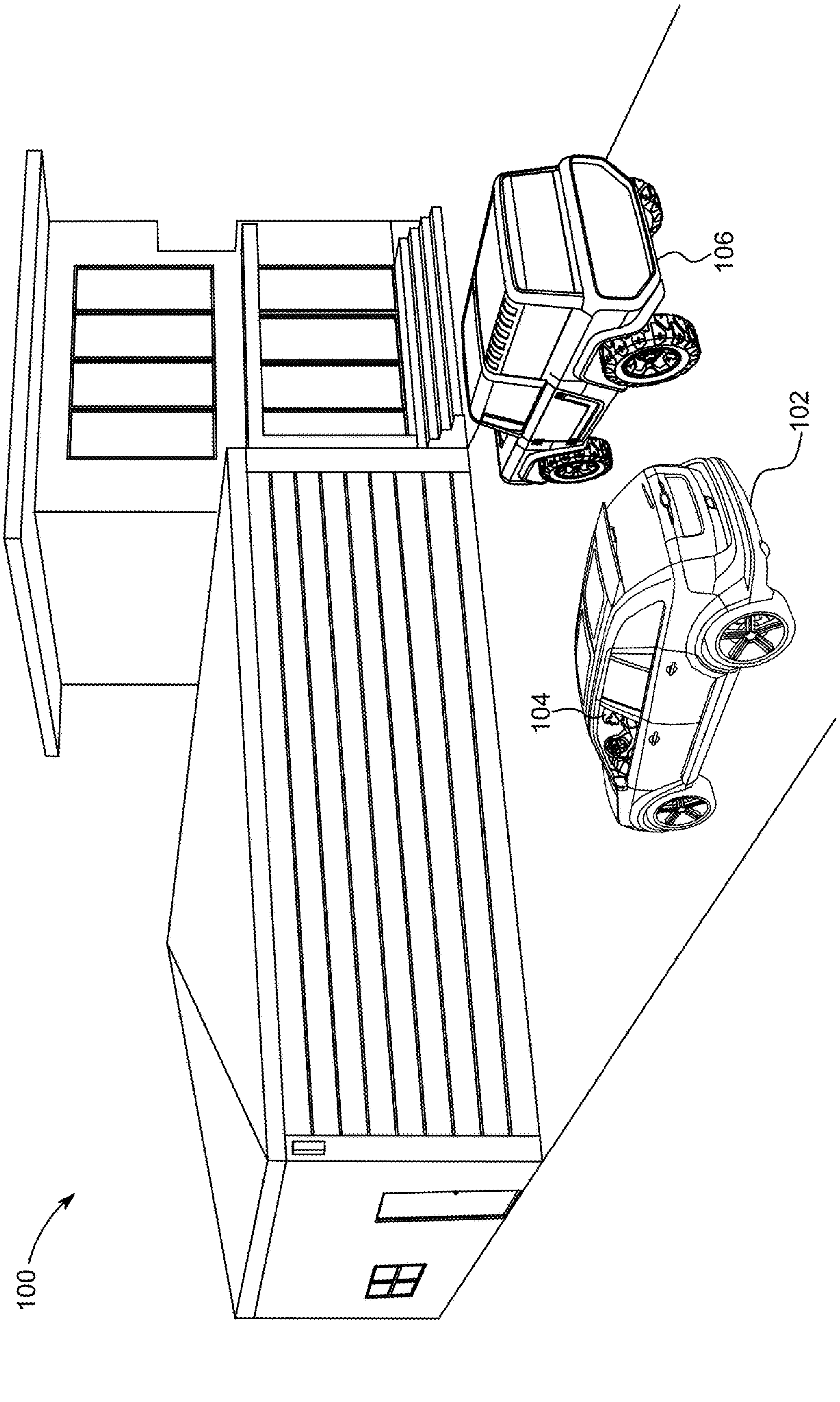
FIG. 1 depicts an environment in which techniques and structures for providing the systems and methods disclosed herein may be implemented.

The present disclosure describes a system and method that may enable a user to use a subscription for a premium vehicle feature (or "premium feature") across multiple vehicles. The system may ensure that the subscription is enabled or accessed on only one vehicle at a time. The system may further enable the user to "share" the subscription with other users and/or use the subscription in taxis, rental vehicles, livery service vehicles or borrowed vehicles. The system may additionally enable the user to use the subscription across vehicles of different manufacturers. For example, if the user owns or is lent a subscription for a premium vehicle feature associated with a first vehicle of a first manufacturer, the user may still be able to conveniently use the same subscription on a second vehicle of a second manufacturer (that may be different from the first manufacturer). In this manner, the system enables the user to "port" the subscription across multiple vehicles. The system may include a server and one or more vehicles that may enable the user to conveniently use the subscription across the vehicles, as briefly described below.

In some aspects, when the user enters a vehicle, the vehicle may first determine that the user is present in the vehicle based on inputs obtained from a vehicle's sensor unit (e.g., interior cameras, Human-Machine Interface (HMI), BLE transceivers, Phone-as-a-key transceivers, and/or the like). The vehicle may additionally determine that the user may be present in the vehicle when the user inputs a predefined authentication code or a request on the HMI or a user device to access a premium vehicle feature on the vehicle, for which the user may own a subscription or for which the user is lent the subscription (e.g., from a different user).

Responsive to determining that the user may be present in the vehicle, the vehicle may obtain "subscription information" associated with the subscription owned by the user or lent to the user, from the server. In an exemplary aspect, the subscription information may indicate when the user purchased or was lent the subscription(s), its validity, a predefined time duration for which the user may access the premium feature in the vehicle, a predefined location at which the user may access the premium feature in the vehicle, an access token to enable the premium feature in the vehicle, subscribed user's login credentials (if required) for accessing an application ("app") associated with the premium feature, one or more predefined usage conditions for the premium feature (e.g., the premium feature may only be accessed when the user is inside the vehicle), and/or the like.

Responsive to obtaining the subscription information as described above, the vehicle may change an operational state of the premium vehicle feature from an inaccessible state to an accessible state. For example, if the premium vehicle feature is associated with a heated steering wheel feature or an autonomous vehicle driving feature, the vehicle may enable these features for the user in the vehicle responsive to obtaining the subscription information.

In some aspects, the vehicle may keep the premium vehicle feature's operational state in the accessible state until the user is present in the vehicle and may revert the operational state to the inaccessible state when the user exits the vehicle. In further aspects, the vehicle may keep the premium vehicle feature's operational state in the accessible state for a predefined time duration (e.g., for a predefined rental period if the vehicle is a rental vehicle) and may revert the operational state to the inaccessible state when the predefined time duration lapses. In additional aspects, the vehicle keeps the premium vehicle feature's operational state in the accessible state when the vehicle may be located in a predefined location and may revert the operational state to the inaccessible state when the vehicle leaves the predefined location.

In an exemplary aspect, when the vehicle is an autonomous taxi/livery vehicle and the premium vehicle feature is associated with an autonomous vehicle driving feature, the vehicle may keep the premium vehicle feature's operational state in the accessible state until the user is present in the vehicle and/or until the vehicle returns to its "return" or source location and may revert the operational state to the inaccessible state when the vehicle returns to the source location.

In further aspects, the vehicle may be configured to automatically download and install an application ("app") associated with the premium vehicle feature for which the user has a valid subscription, if the vehicle determines that the app is already not installed in the vehicle. For example, if the premium vehicle feature is associated with a video/audio streaming platform and the vehicle determines that the app associated with the streaming platform is not already installed on the vehicle when the user is present in the vehicle, the vehicle may automatically download and install the app to enable the user to conveniently access the streaming platform.

The present disclosure may have applicability in further application areas, in addition to the application areas described above. For example, a fleet manager may use the systems and methods disclosed in the present disclosure to manage subscriptions for premium vehicle features that the fleet manager may own across the vehicle fleet. In this case, as an example, if the fleet manager has 30 fleet vehicles and 10 subscriptions, the fleet manager may activate the subscriptions on any of the 10 vehicles at any time based on the vehicle's expected usage.

In another exemplary aspect, the user may purchase a single subscription and may use different premium vehicle features on different times using the same single subscription. For example, the user may enable a premium vehicle feature 1 on Day 1, feature 2 on Day 2, and so on using the same single subscription. The user may further "distribute" the usage of the subscription amongst the user's family members, based on individual family member's usage requirements.

The present disclosure discloses a system and method that may enable a user to use a subscription for a premium vehicle feature across multiple vehicles and/or lend the subscription owned by the user to different users. The system may enable the user to use the same subscription across vehicles of different manufacturers. The system may further enable the user to lend the subscription to other users and add predefined usage conditions or constraints on the subscription usage. For example, the user may indicate that the subscription may be accessed only for a predefined time duration or at a predefined location, or the subscription may only be accessed when the user to whom the subscription is lent in present in the vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a first vehicle 102 (or vehicle 102) and a user 104 ("first user") who may be present inside the vehicle 102. The user 104 may be the owner of the vehicle 102 or may be a family member, friend, or any other person known to the vehicle owner. The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain, such as a gasoline engine or a hybrid system.

Figure 3:
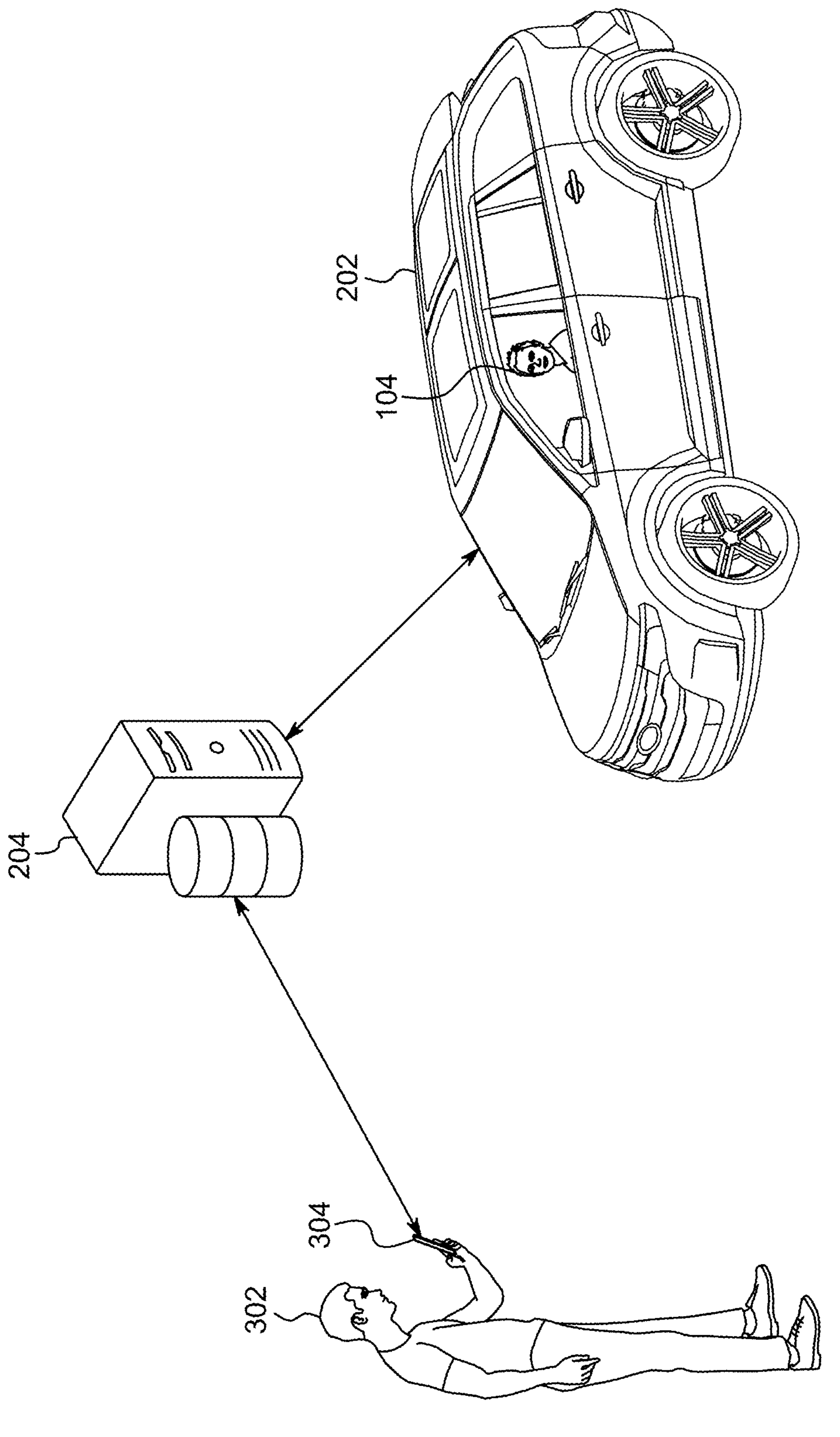
FIG. 3 depicts an example view of a first user enabling access of a vehicle feature in a vehicle for a second user in accordance with the present disclosure.

In some aspects, the vehicle 102 may enable the user 104 to access one or more vehicle features or components that may be subscribed by the user 104 or lent to the user 104 by a second user (e.g., a user 302 shown in FIG. 3). Specifically, the vehicle 102 may have one or more "premium" features or components that the user 104 (or the second user) may access in the vehicle 102 after purchasing a subscription for such features from the vehicle's manufacturer or dealer. Examples of such premium features include, but are not limited to, an autonomous or automated driving feature, a heated sitting area feature, a massaging sitting area feature, a heated steering wheel feature, an entertainment feature, a social networking feature, enhanced vehicle aerodynamic properties, a premium fuel calibration, an enhanced transmission calibration, an enhanced vehicle stability control, a vehicle drift mode, and/or the like.

In some aspects, the vehicle 102 may enable the user 104 to access one or more premium features described above in the vehicle 102 even if the user 104 did not purchase the subscription of such features for the vehicle 102. For example, if the user 104 purchased a subscription for a premium feature (e.g., the heated steering wheel feature) for a second vehicle 106 (or any other vehicle), the vehicle 102 may still enable the user 104 to access the heated steering wheel feature in the vehicle 102 by making the user's subscription "portable" amongst a plurality of vehicles. In this case, the user 104 may own both the vehicles 102, 106 and may request the vehicle 102 to enable the heated steering wheel feature in the vehicle 102 when the user 104 may be using or expected to use the vehicle 102. In this specific example, the vehicle 102 may enable the user 104 to access the heated steering wheel feature in the vehicle 102 via the user's subscription (that may have been originally purchased for the vehicle 106). Further, in this case, the vehicle 106 may disable the heated steering wheel feature in the vehicle 106 when the vehicle 102 enables this feature for the user 104, so that the heated steering wheel feature is enabled at only one vehicle at a given time.

In this manner, the vehicles 102, 106 may enable the user 104 to switch premium subscribed features back-and-forth between the vehicles 102, 106 based on user's requirements, via a single subscription owned by the user 104. Stated another way, the present disclosure enables the user 104 to purchase a single subscription for a premium vehicle feature, and use that subscription across multiple vehicles (by using the premium vehicle feature in any one vehicle at a time), thereby eliminating the need for the user 104 to purchase multiple subscriptions for the same premium feature if the user 104 owns multiple vehicles or is expected to use different vehicles at different times.

In other aspects, the vehicle 102 may enable the user 104 to access one or more premium subscribed features in the vehicle 102 even if the user 104 did not purchase the subscription, but the subscription was "lent" to the user 104 by the second user. As an example, if the vehicle 106 is owned by the second user and the second user purchased the subscription for the vehicle 106, the second user may lend the subscription to the user 104 so that the user 104 may access the premium feature in the vehicle 102. In this case, the second user may lend the subscription to the user 104 for a predefined time duration (e.g., for 6 hours, 12 hours, 1 day, a weekend, etc.), and the vehicle 102 may enable the user 104 to access the premium feature in the vehicle 102 only for the predefined time duration. Further, in this case, the premium feature may be inaccessible in the vehicle 106 for the predefined time duration, so that the subscription is used on only one vehicle at a time (i.e., only on the vehicle 102). After the predefined time duration lapses, the vehicle 102 may disable the premium feature's access in the vehicle 102, and the vehicle 106 may make the premium feature accessible for the second user.

An example process followed by the vehicle 102 to enable and disable access of premium subscribed features in the vehicle 102 is briefly described below and described in detail later in conjunction with FIG. 2.

The vehicle 102 may first determine that the user 104 may be present inside the vehicle 102 based on inputs obtained from a vehicle's sensor unit (which may include sensors/components such as cameras, vehicle's Bluetooth Low Energy (BLE) transceiver and/or Phone-as-a-key transceiver, vehicle's infotainment system or Human-Machine Interface (HMI), and/or the like). Responsive to determining that the user 104 may be present in the vehicle 102, the vehicle 102 may determine one or more subscriptions associated with premium vehicle features that the user 104 may own or may be lent to the user 104 by the second user. The vehicle 102 may make such determination by transmitting a request to an external server (shown as server 204 in FIG. 2) or a computing device (shown as computing device 208 in FIG. 2) associated with a fleet manager if the vehicle 102 is part of a fleet. Responsive to transmitting the request, the vehicle 102 may receive information (or "subscription information") associated with the subscriptions owned by the user 104 or lent to the user 104 by the second user from the server/computing device.

If the subscription is owned by the user 104 for any other vehicle different from the vehicle 102, the information obtained from the server/computing device may indicate when the user 104 purchased the subscription(s), its validity, a predefined time duration for which the user 104 may access the premium feature in the vehicle 102, a predefined location at which the user 104 may access the premium feature in the vehicle 102, an access token to enable the premium feature, subscribed user's login credentials (if required) for accessing an application ("app") associated with the premium feature, one or more predefined usage conditions for the premium feature (e.g., the premium feature may only be enabled when the user 104 is inside the vehicle 102), and/or the like.

Similarly, if the subscription is lent to the user 104 by the second user, the information obtained from the server/computing device may include a confirmation by the second user to lend the subscription to the user 104, the predefined time duration for which the user 104 may access the premium feature in the vehicle 102 (i.e., the time duration for which the subscription is lent to the user 104), the predefined location at which the user 104 may access the premium feature in the vehicle 102, the access token to enable the premium feature, the subscribed user's login credentials (if required) for accessing the app associated with the premium feature, one or more predefined usage conditions for the premium feature (e.g., the premium feature may only be enabled when the user 104 is inside the vehicle 102), and/or the like.

In some aspects, responsive to obtaining the subscription information from the server/computing device as described above, the vehicle 102 may first check whether the app associated with the subscribed premium feature is already installed in the vehicle 102 or not. The vehicle 102 may transmit a download request to the server to download the app when the app is not installed in the vehicle 102. The vehicle 102 may further download and install the app in the vehicle 102 responsive to transmitting the download request. The vehicle 102 may then automatically add the subscribed user's login credentials in app to make the premium feature accessible for the user 104 in the vehicle 102.

In this manner, the user 104 may access the premium feature in the vehicle 102 even if the subscription for the premium feature was not purchased for the vehicle 102. In some aspects, the access token (which is part of the subscription information that the vehicle 102 receives from the server/computing device) that enables the premium feature's access in the vehicle 102 may only work on one vehicle/device at a time. Therefore, when the vehicle 102 enables the premium feature in the vehicle 102 responsive to receiving the access token, the access to the premium feature may be disabled in the other vehicle (e.g., the vehicle 106) where the access may have been enabled previously (i.e., before the vehicle 102 enabled the premium feature in the vehicle 102). In an exemplary aspect, in this case, responsive to transmitting the access token to the vehicle 102, the server/computing device may transmit a vehicle feature inaccessible command to the other vehicle (e.g., the vehicle 106) where the access was previously enabled, so that the vehicle 106 may disable the premium feature access.

It may be appreciated from the description above that by using the systems and methods disclosed in the present disclosure, the user 104 may conveniently use a single subscription for a premium vehicle feature across multiple vehicles (such that the premium feature is accessible in one only vehicle at a time).

The present disclosure is not limited to the aspect of the user 104 using the subscription to only those vehicles that are "owned" by the user 104. In additional aspects, the user 104 may use the subscription for the premium feature that the user 104 may own (or is lent to the user 104) in rental vehicles, taxis (or livery service vehicles), etc. The user 104 may also use the subscription across vehicles made from different manufacturers. For example, if the second user purchased a subscription of a premium feature for the vehicle 106 that is associated with a first manufacturer, the user 104 may still be able to access the premium feature in the vehicle 102 if the second user lent the subscription to the user 104, even if the vehicle 102 is associated with a second manufacturer (that may be different from the first manufacturer).

Further vehicle details are described below in conjunction with FIG. 2.

The vehicles 102, 106 implement and/or perform operations, as described here in the present disclosure, in accordance with the owner manual and safety guidelines. In addition, any action taken by the user 104 based on the notifications provided by the vehicles 102, 106 should comply with all the rules specific to the location and operation of the vehicles 102, 106 (e.g., Federal, state, country, city, etc.). The notifications, as provided by the vehicles 102, 106, should be treated as suggestions and only followed according to any rules specific to the location and operation of the vehicles 102, 106.

Figure 2:
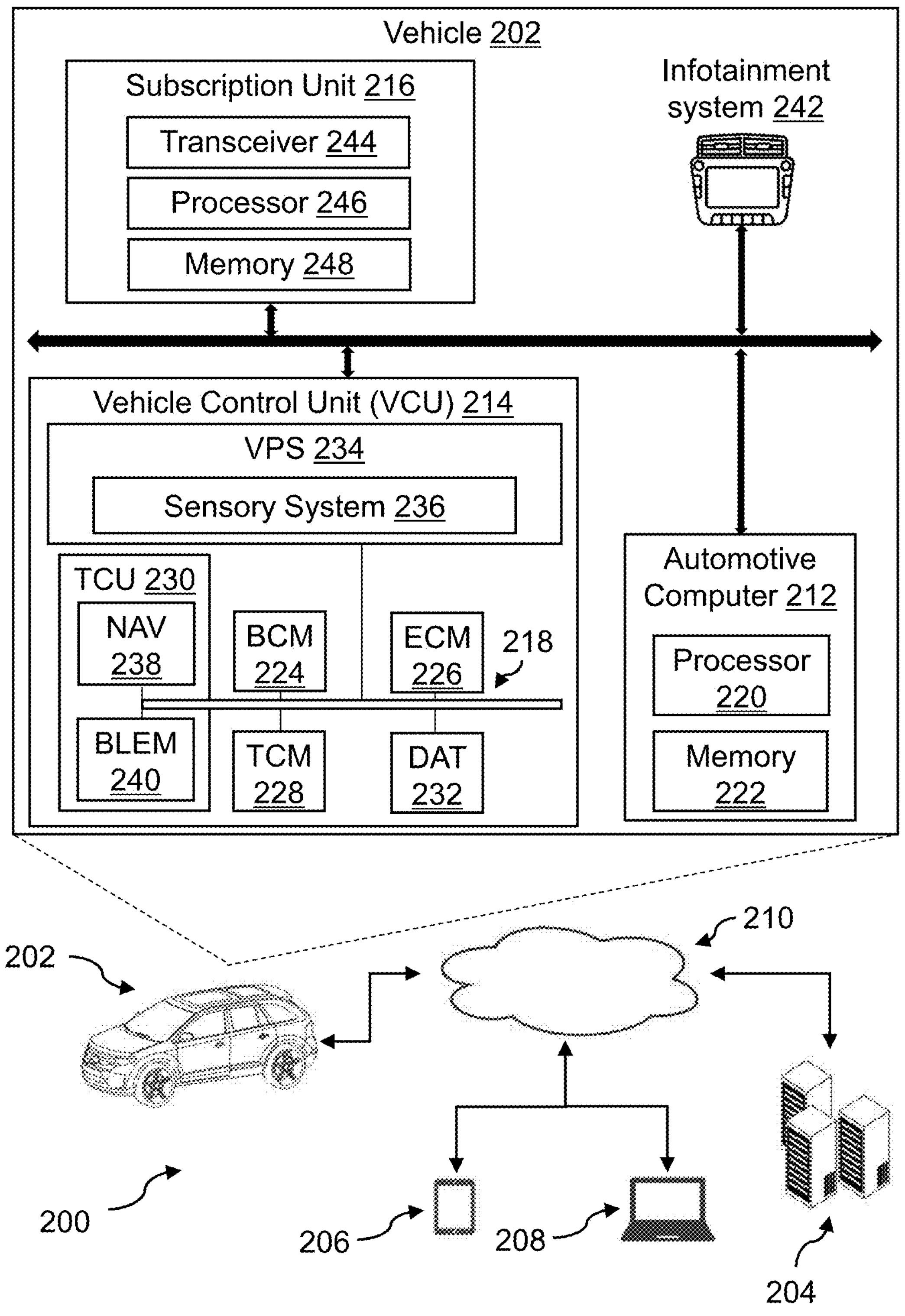
FIG. 2 depicts a block diagram of a system to enable portability of vehicle feature subscriptions in accordance with the present disclosure.

FIG. 2 depicts a block diagram of a system 200 to enable portability of vehicle feature subscriptions in accordance with the present disclosure. While describing FIG. 2, references will be made to FIGS. 3 and 4.

The system 200 may include a vehicle 202, one or more servers 204 (or a server 204), a user device 206 and a computing device 208 that may be communicatively coupled with each other via one or more networks 210. The vehicle 202 may be the same as the vehicle 102 described above in conjunction with FIG. 1. The server 204 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In further aspects, the server 204 may store subscription information associated with subscriptions of premium vehicle features that may have been purchased by a plurality of users (including the user 104 and a user 302 shown in FIG. 3). The server 204 may obtain the subscription information for each subscription from the computing devices of vehicle manufacturers, dealers, fleet managers, and/or the like, or directly from respective users (via their user devices). In some aspects, the subscription information may be dynamic or may be updated regularly, based on inputs obtained from the vehicle manufacturers, dealers, fleet managers, and/or the like, or the respective users. For example, the subscription information may be regularly updated for a specific user (e.g., the user 104) based on new subscriptions that the user 104 may purchase, expiry of old subscriptions, user actions of lending-out the subscriptions to other users, temporary subscriptions that may be lent-in to the user 104, and/or the like.

The examples of the subscription information are described above in conjunction with FIG. 1. The server 204 may transmit the subscription information associated with the subscription(s) purchased by the user 104 or lent to the user 104 when the user 104 may be present in the vehicle 202 and/or when the vehicle 202 transmits a request to the server 204 to obtain such information.

In some aspects, the server 204 may further store software packages/files for applications ("apps") associated with a plurality of premium vehicle features. For example, the server 204 may store software packages/files for social networking, entertainment, and/or video/audio streaming apps that the vehicle 202 may enable the user 104 to access, when the user 104 has purchased or is lent the subscriptions of such apps. The server 204 may transmit the software packages/files associated with one or more apps to the vehicle 202 when the vehicle 202 transmits a request to the server 204 to obtain such software packages/files.

The user device 206 may be associated with the user 104 and may be, for example, a mobile phone, a laptop, a computer, a tablet, a smartwatch, a device with an Ultra-Wideband (UWB) or a near-field communication (NFC) tag, or any other communication device that the user 104 may have pre-synced or registered with the vehicle 202. The computing device 208 may be associated with a fleet manager if the vehicle 202 is part of a fleet.

The network(s) 210 illustrates an example communication infrastructure in which the connected devices discussed in various embodiments of this disclosure may communicate. The network(s) 210 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 212, a Vehicle Control Unit (VCU) 214 and a subscription unit 216 (or unit 216). The VCU 214 may include a plurality of Electronic Control Units (ECUs) 218 in communication with the automotive computer 212.

In some aspects, the automotive computer 212 and/or the unit 216 may be installed anywhere in the vehicle 102, in accordance with the disclosure. Further, the automotive computer 212 may operate as a functional part of the unit 216. The automotive computer 212 may be or include an electronic vehicle controller, having one or more processor(s) 220 and a memory 222. Moreover, the unit 216 may be separate from the automotive computer 212 (as shown in FIG. 2) or may be integrated as part of the automotive computer 212.

The processor(s) 220 may be in communication with one or more memory devices in communication with the respective computing systems (e.g., the memory 222 and/or one or more external databases not shown in FIG. 2). The processor(s) 220 may utilize the memory 222 to store programs in code and/or to store data for performing aspects in accordance with the disclosure. The memory 222 may be a non-transitory computer-readable medium or memory storing a subscription management program code. The memory 222 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 214 may share a power bus with the automotive computer 212 and may be configured and/or programmed to coordinate the data between vehicle 202 systems, connected servers (e.g., the server(s) 204), and other vehicles (not shown in FIG. 2) operating as part of a vehicle fleet. The VCU 214 may include or communicate with any combination of the ECUs 218, such as a Body Control Module (BCM) 224, an Engine Control Module (ECM) 226, a Transmission Control Module (TCM) 228, a Telematics Control Unit (TCU) 230, a Driver Assistances Technologies (DAT) controller 232, etc.

The VCU 214 may further include and/or communicate with a Vehicle Perception System (VPS) 234, having connectivity with and/or control of one or more vehicle sensory system(s) 236. The vehicle sensory system 236 may include one or more vehicle sensors including, but not limited to, a radio detection and ranging (radar) sensor configured for detection and localization of objects inside and outside the vehicle 202 using radio waves, sitting area buckle sensors, sitting area sensors, a light detecting and ranging (lidar) sensor, door sensors, proximity sensors, temperature sensors, wheel sensors, ambient weather sensors, ambient light sensors, vehicle internal and external cameras, one or more rain sensors, a humidity sensor, a tire pressure sensor, ultrasonic sensors, etc.

In some aspects, the VCU 214 may control vehicle operational aspects and implement one or more instruction sets received from the user device 206, from one or more instruction sets stored in the memory 222, including instructions operational as part of the unit 216.

The TCU 230 may be configured and/or programmed to provide vehicle connectivity to wireless computing systems onboard and off board the vehicle 202 and may include a Navigation (NAV) receiver 238 for receiving and processing a GPS signal, a BLE Module (BLEM) 240, a Wi-Fi transceiver, a UWB transceiver, and/or other wireless transceivers (not shown in FIG. 2) that may be configurable for wireless communication (including cellular communication) between the vehicle 202 and other systems (e.g., the user device 206, a key fob, an NFC device, etc.), computers, and modules. The NAV receiver 238 may be configured to determine a real-time vehicle geolocation. The TCU 230 may be in communication with the ECUs 218 by way of a bus.

In some aspects, the vehicle 202 may further include one or more BLE transceivers, Phone-as-a-key transceivers, and/or other similar transceivers, which may be part of a vehicle's sensor unit and may enable the vehicle 202 to determine if one or more user devices pre-synced or registered with the vehicle 202 are within a predefined range of the vehicle 202. Specifically, the transceivers described above may automatically couple with the pre-synced user devices via BLE, UWB, NFC, etc. when the user devices may be within a predefined range of the vehicle 202, indicating to the vehicle 202 that these user devices are in proximity to the vehicle 202 or in the vehicle interior portion. Consequently, when the user 104 enters the vehicle 202, the vehicle 202 may check inputs from these transceivers to determine whether the pre-synced user devices (e.g., the user device 206) are with the user 104. The vehicle 102 may determine that the pre-synced user devices are with the user 104 (and hence the user 104 is in the vehicle 202) when the inputs from the transceivers indicate that the transceivers are communicatively coupled with these devices.

The ECUs 218 may control aspects of vehicle operation and communication using inputs from human drivers, inputs from an autonomous vehicle controller, the unit 216, and/or via wireless signal inputs received via the wireless connection(s) from other connected devices, such as the user device 206, the server(s) 204, among others.

The BCM 224 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), speakers, wipers, door locks and access control, mirrors, various comfort controls, enclosures, and/or the like. The BCM 224 may also operate as a gateway for bus and network interfaces to interact with remote ECUs (not shown in FIG. 2).

The DAT controller 232 may provide Level-1 through Level-3 automated driving and driver assistance functionality that may include, for example, active parking assistance, vehicle backup assistance, and adaptive cruise control, among other features. The DAT controller 232 may also provide aspects of user and environmental inputs usable for user authentication.

In some aspects, the automotive computer 212 may connect with an infotainment system 242 (or a vehicle Human-Machine Interface (HMI) 242). The infotainment system 242 may include a touchscreen interface portion and may include voice recognition features, biometric identification capabilities that can identify users based on facial recognition, voice recognition, fingerprint identification, or other biological identification means. In other aspects, the infotainment system 242 may further receive user instructions/inputs via the touchscreen interface portion and/or display notifications/recommendations, navigation maps, etc. on the touchscreen interface portion.

In an exemplary aspect, the infotainment system 242, the vehicle sensory system 236, the BLE transceiver(s), the Phone-as-a-key transceivers, and/or the like may collectively be part of a vehicle's sensor unit, which may be configured to detect a presence of the user 104 in the vehicle 202. For example, the sensor unit may detect that the user 104 may be present in the vehicle 202 based on facial recognition technology (e.g., via the infotainment system 242 and/or the user images captured by the vehicle interior cameras). In this case, the user images captured by the sensor unit may be compared (e.g., by the processor 220) with pre-stored images of the user 104 (that may be stored in the memory 222), and the processor 220 may determine that the user 104 may be present in the vehicle 202 when the user images captured by the sensor unit match with the pre-stored user images.

As another example, the sensor unit may detect that the user 104 may be present in the vehicle 202 based on inputs obtained from the BLE transceivers, Phone-as-a-key transceivers, and/or the like. In this case, the sensor unit may detect that the user 104 may be present in the vehicle 202 when the inputs obtained from the transceivers described above indicate that the transceivers are communicatively coupled with the user device 206 (indicating that the user 104, carrying the user device 206, may be present in the vehicle 202).

As yet another example, the sensor unit may detect that the user 104 may be present in the vehicle 202 based on a predefined authentication code obtained by the sensor unit from the user 104 via the infotainment system 242 and/or the user device 206. In this case, when the user 104 intends to access one or more vehicle features (e.g., premium and subscribed vehicle features), the user 104 may input a predefined authentication code on the infotainment system 242, which may indicate to the sensor unit that the user 104 may be present in the vehicle 202.

The computing system architecture of the automotive computer 212, the VCU 214, and/or the unit 216 may omit certain computing modules. It should be readily understood that the computing environment depicted in FIG. 2 is an example of a possible implementation according to the present disclosure, and thus, it should not be considered limiting or exclusive.

In accordance with some aspects, the unit 216 may be integrated with and/or executed as part of the ECUs 218. The unit 216, regardless of whether it is integrated with the automotive computer 212 or the ECUs 218, or whether it operates as an independent computing system in the vehicle 202, may include a transceiver 244, a processor 246, and a computer-readable memory 248.

The transceiver 244 may receive information/inputs from one or more external devices or systems, e.g., the user device 206, the server(s) 204, and/or the like via the network 210. For example, the transceiver 244 may receive the subscription information and/or the software packages/files for apps associated with a plurality of premium vehicle features described above from the server 204 via the network 210. Further, the transceiver 244 may transmit notifications to the external devices or systems. In addition, the transceiver 244 may receive information/inputs from vehicle 202 components such as the infotainment system 242, the VCU 214, and/or the like. Further, the transceiver 244 may transmit notifications/command signals to the vehicle 202 components such as the VCU 214, the infotainment system 242, the BCM 224, etc.

The processor 246 and the memory 248 may be the same as or similar to the processor 220 and the memory 222, respectively. In some aspects, the processor 246 may utilize the memory 248 to store programs in code and/or to store data for performing aspects in accordance with the disclosure. The memory 248 may be a non-transitory computer-readable medium or memory storing the subscription management program code.

In operation, the processor 246 may first determine that the user 104 may be present in the vehicle 202 based on the inputs obtained from the sensor unit as described above and/or user inputs/request obtained from the user device 206. For example, the processor 246 may determine that the user 104 may be present in the vehicle 202 when the vehicle's interior cameras/infotainment system 242 capture the user image and recognize the user 104 based on facial recognition technology. The processor 246 may additionally determine that the user 104 may be present in the vehicle 202 when the user device 206 communicatively couples with the vehicle's BLE transceiver, Phone-as-a-key transceiver, and/or the like. As another example, the processor 246 may determine that the user 104 may be present in the vehicle 202 when the user 104 inputs a predefined authentication code on the infotainment system 242 or the user device 206, or transmits a request (via the infotainment system 242/user device 206 and the transceiver 244) to the vehicle 202 indicating that the user 104 desires to access one or more premium subscribed vehicle features. As yet another example, the processor 246 may determine that the user 104 may be present in the vehicle 202 when the user 104 connects a predefined electronic hardware (e.g., a USB dongle) to the vehicle 202.

Responsive to determining that the user 104 may be present in the vehicle 202 by any of the means described above (and/or any other means not described above), the processor 246 may obtain the subscription information associated with the user 104 from the server 204 and/or the computing device 208. Stated another way, responsive to determining that the user 104 may be present in the vehicle 202, the processor 246 may obtain the information (or "subscription information") associated with the subscription (s) for one or more vehicle features owned by the user 104 or lent to the user 104 by a second user (e.g., the user 302 shown in FIG. 3). As an example, the subscription information may indicate that the user 104 has purchased or is lent a subscription to access the vehicle's heated steering wheel feature. The processor 246 may obtain the subscription information to enable the user 104 to access the premium vehicle features for which the user 104 has valid subscriptions (even if the subscriptions were purchased for any other vehicle different from the vehicle 202, as described above in conjunction with FIG. 1).

In some aspects, the subscription information may include an access token to enable the premium vehicle feature's subscription/access (e.g., access to the heated steering wheel feature) at the vehicle 202 or make the premium vehicle feature "accessible" in the vehicle 202. Responsive to obtaining the access token, the processor 246 may change an operational state of the premium vehicle feature from an inaccessible state to an accessible state. As an example, responsive to obtaining the access token, the processor 246 may enable the heated steering wheel feature in the vehicle 202.

In an exemplary aspect, before changing the premium vehicle feature's operational state from the inaccessible state to the accessible state as described above, the processor 246 may check (after obtaining the subscription information from the server 204) if an app associated with the premium vehicle feature may be required to operate the premium vehicle feature and is already not installed in the vehicle 202. For example, if the premium vehicle feature is associated with a media streaming platform, the processor 246 may determine than an app associated with the media streaming platform may be required to enable the user 104 to access it, before changing the operation state to the accessible state. In this case, if the app is not already installed in the vehicle 202, the processor 246 may transmit a request to the server 204 to download the app (or its software package/files) at the vehicle 202. Responsive to transmitting the request, the processor 246 may obtain the corresponding software package/files from the server 204. The processor 246 may further download and install the app on the vehicle 202 based on the software package/files and then change the premium vehicle feature's operational state to the accessible state. The processor 246 may further automatically add login credentials associated with the subscription on the app, to enable the user 104 to conveniently access the premium vehicle feature.

The user 104 may access/use the premium vehicle feature in the vehicle 202 when the processor 246 changes the premium vehicle feature's operational state to the accessible state. As described above in conjunction with FIG. 1, the processor 246 may enable the user 104 to access the premium vehicle feature in the vehicle 202, even if the subscription for the premium vehicle feature was purchased for any other vehicle different from the vehicle 202. In this manner, the vehicle 202 and the server 204 (that transmits the subscription information to the vehicle 202) in combination enables the user 104 to use a single subscription across multiple vehicles.

As described above, the access token that the processor 246 obtains from the server 204 as part of the subscription information may enable the premium vehicle feature to be accessible on only one vehicle at a time. Consequently, if the user 104 owns two vehicles 202, 106 or the vehicles 202, 106 are part of a vehicle fleet and the premium vehicle feature was enabled at the vehicle 106 previously before being enabled in the vehicle 202 as described above, the access to the premium vehicle feature may immediately get disabled at the vehicle 106 when the access to the premium vehicle feature gets enabled in the vehicle 202. In this case, responsive to transmitting the access token (as part of the subscription information) to the vehicle 202, the server 204 may transmit a vehicle feature inaccessible command to the vehicle 106. The vehicle 106 may disable the access to the premium vehicle feature (or make the feature "inaccessible") in the vehicle 106 responsive to receiving the vehicle feature inaccessible command from the server 204. In this manner, the server 204 and the vehicles 202, 106 ensure that the premium vehicle feature is accessible on only one vehicle at a time.

In some aspects, if the subscription to the premium vehicle feature is "lent" to the user 104 by the user 302, the user 302 may indicate, in the subscription information, one or more predefined conditions/parameters for the usage of the premium vehicle feature in the vehicle 202. In this case, the user 302 may transmit (via a user device 304, as shown in FIG. 3) information associated with the predefined conditions for the premium vehicle feature's usage in the vehicle 202 to the server 204. The predefined conditions may be, for example, that the premium vehicle feature may be accessed in the vehicle 202 only for a predefined time duration or only at a predefined location. In this case, the information that the user 302 transmits to the server 204 via the user device 304 may also include a confirmation to lend the premium vehicle feature's subscription to the user 104 at the vehicle 202 for the predefined time duration and/or at the predefined location. The server 204 may transmit this information to the vehicle 202 as part of the subscription information, and the processor 246 may change the premium vehicle feature's operational state to the accessible state based on the obtained subscription information as described above.

In some aspects, the user 302 is not required to be present in the vehicle 202 when the user 302 lends the subscription for the premium vehicle feature to the user 104. The user 302 may lend the subscription to the user 104 remotely, via the user device 304.

In one exemplary aspect, when the predefined conditions set by the user 302 (or the subscription information) indicate that the premium vehicle feature is to be accessed only for a predefined time duration (e.g., for 6 hours or 12 hours), the processor 246 may change the premium vehicle feature's operational state to the accessible state when the user 104 may be present in the vehicle 202 and cause the premium vehicle feature to stay in the accessible state for the predefine time duration. Thereafter, when the predefine time duration lapses, the processor 246 may cause the premium vehicle feature's operational state to return to the inaccessible state.

In a second exemplary aspect, when the predefined conditions set by the user 302 (or the subscription information) indicate that the premium vehicle feature is to be accessed only at a predefined location (e.g., at a race track), the processor 246 may change the premium vehicle feature's operational state to the accessible state when the vehicle 202 may be located at the predefined location (determined based on the inputs obtained from the TCU 230) and not at any other location. In this case, the processor 246 may change the premium vehicle feature's operational state from the inaccessible state to the accessible state when the vehicle 202 enters the predefined location and may cause the operational state to return to the inaccessible state when the vehicle 202 exits the predefined location.

As an example, when the premium vehicle feature is associated with enhanced vehicle performance (e.g., enhanced vehicle aerodynamic properties, a premium fuel calibration, an enhanced transmission calibration, an enhanced vehicle stability control, a vehicle drift mode, etc.), the user 302 may desire that the user 104 should only use these features when the vehicle 202 is on a race track and not in any other location. In this case, the user 302 may set a predefined condition that such enhanced vehicle performance features should only be accessed in the vehicle 202 when the vehicle 202 is on the race track. In this specific example, the processor 246 may change the premium vehicle feature's operational state to the accessible state only when the vehicle 202 is located on the race track and may keep the operational state as inaccessible otherwise.

In some aspects, the user 104 is not required to be sitting in the driver's sitting area in the vehicle 202 to access the premium vehicle feature(s) described above. For example, even if the user 104 is a passenger and not driving the vehicle 202, the user 104 may still access the premium vehicle feature, provided the user 104 has a valid subscription for the premium vehicle feature or is lent the subscription by the user 302. In this manner, the present disclosure enables a passenger also to access premium vehicle features, as long as the passenger has a valid subscription.

Figure 4:
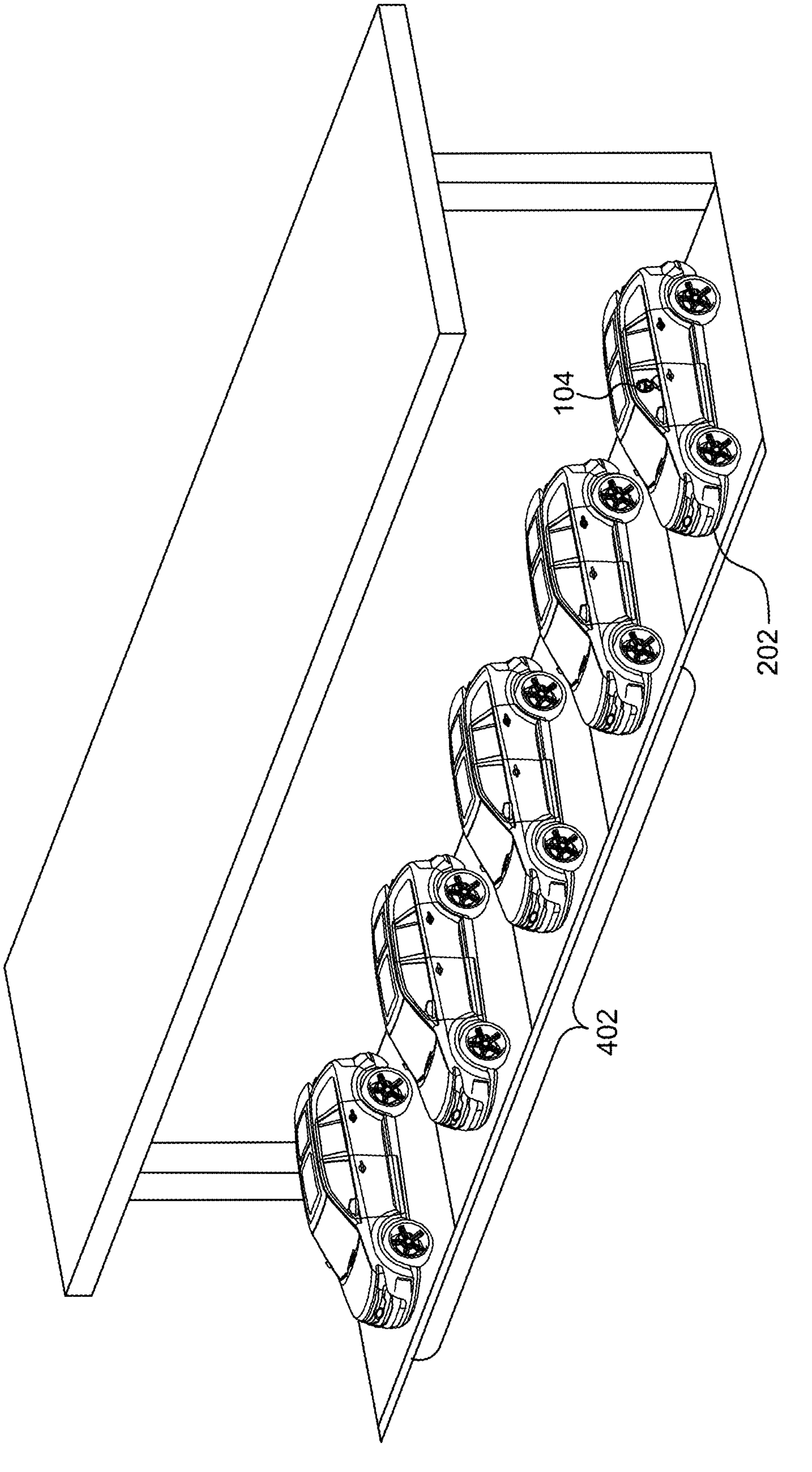
FIG. 4 depicts an example view of a user accessing a rental vehicle in accordance with the present disclosure.

Furthermore, the user 104 is not required to "own" the vehicle 202 to access the premium vehicle feature for which the user 104 may have a subscription or for which a subscription is lent to the user 104. For example, the user 104 may access the premium vehicle feature even when the vehicle 202 is a rental vehicle (or a taxi), as shown in FIG. 4. In the exemplary aspect depicted in FIG. 4, the user 104 may be assessing a rental vehicle 202 (from a plurality of rental vehicles 402) in a rental vehicle parking lot. In this case, responsive to entering the vehicle 202, the user 104 may transmit a request (e.g., by inputting a predefined authorization code on the infotainment system 242 or the user device 206) to the vehicle 202 to enable the premium vehicle feature whose subscription the user 104 may own or may be lent to the user 104. Responsive to receiving the request, the vehicle 202 may fetch the subscription information from the server 204 as described above and change the premium vehicle feature's operational state from the inaccessible state to the accessible state.

In an exemplary aspect, in this case, the vehicle 202 may change the premium vehicle feature's operational state to the accessible state for a predefined rental period or on a specific road or offer the premium vehicle feature for a trial period and then revert the operational state to the inaccessible state. In another exemplary aspect, the vehicle 202 may change the premium vehicle feature's operational state to the accessible state only when the user 104 may be present in the vehicle 202 and may revert the operational state to the inaccessible state when the user 104 exits the vehicle 202. In this case, the processor 246 may first change the premium vehicle feature's operational state to the accessible state when the user 104 enters the vehicle 202 and keep the keep the vehicle feature in the accessible state until the user 104 is present in the vehicle 202. The processor 246 may further monitor the user presence in the vehicle 202 based on the inputs obtained from the sensor unit described above. The processor 246 may cause the premium vehicle feature's operational state to return to the inaccessible state when the processor 246 determines that the user 104 may have exited the vehicle 202 (determined based on the inputs obtained from the sensor unit). In this case, the processor 246 may cause the premium vehicle feature's operational state to return to the inaccessible state even if other users (different from the user 104) may still be present in the vehicle 202. Stated another way, the vehicle 202 may enable the access to the premium vehicle feature as long as the user 104 (who has the valid subscription) is present in the vehicle 202.

In further aspects, the user 104 may access the premium vehicle feature even when the vehicle 202 is an autonomous taxi or a livery service vehicle (or a borrowed vehicle). In this case, as an example, if the subscription (owned by the user 104 or lent to the user 104) is associated with an autonomous driving feature, the processor 246 may first fetch route information for the vehicle 202 from the server 204 or the user device 206, when the user 104 enters the vehicle 202 and requests to have the autonomous driving feature enabled. The processor 246 may then determine a destination location and a return location for the vehicle 202 based on the route information. The processor 246 may further enable the autonomous driving feature and autonomously move the vehicle 202 to the destination location responsive to determining that the user 104 is present in the vehicle 202. The processor 246 may further autonomously move the vehicle 202 to the return location from the destination location after the user 104 exits the vehicle 202 at the destination location and then cause the operational state of the autonomous driving feature to return to the inaccessible state (or disable the autonomous driving feature) when the vehicle 202 reaches the return location. In this manner, the user 104 may use the autonomous driving feature that the user 104 may have a subscription for, in taxis or livery vehicles.

As described above in conjunction with FIG. 1, the user 104 may use the subscription across vehicles made from different manufacturers. For example, if the subscription for the premium vehicle feature (that the user 104 owns or is lent to the user 104) is associated with a first vehicle manufacturer, and the user 104 attempts to use the subscription in the vehicle 202 that is associated with a second vehicle manufacturer (that may be different from the first manufacturer), the vehicle 202 may still enable access to the subscription/premium vehicle feature. In this manner, the user 104 may use the subscription across vehicles made from different manufacturers.

The present disclosure may have applicability in further application areas, in addition to the application areas described above. For example, a fleet manager may use the systems and methods disclosed in the present disclosure to manage subscriptions for premium vehicle features that the fleet manager may own across the vehicle fleet. In this case, as an example, if the fleet manager has 30 fleet vehicles and 10 subscriptions, the fleet manager may activate the subscriptions on any of the 10 vehicles at any time based on the vehicle's expected usage. For example, the fleet manager may enable the access for premium vehicle features on those vehicles that may be expected to travel long distances.

In another exemplary aspect, the user 104 may purchase a single subscription and may use different premium vehicle features on different times using the same single subscription. For example, the user 104 may enable a premium vehicle feature 1 on Day 1, feature 2 on Day 2, and so on, using the same single subscription. The user 104 may further "distribute" the usage of the subscription amongst different family members of the user 104, based on individual family member's usage requirements.

Figure 5:
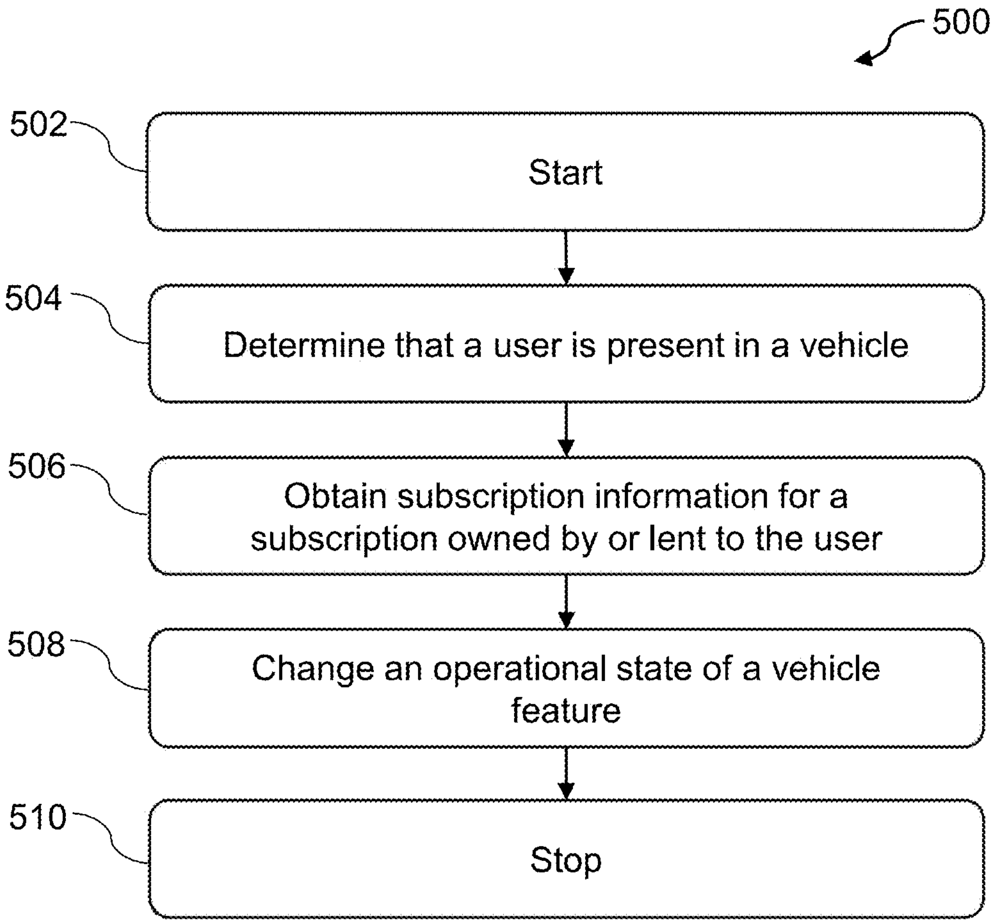
FIG. 5 depicts a flow diagram of an example method to enable portability of vehicle feature subscriptions in accordance with the present disclosure.

FIG. 5 depicts a flow diagram of an example method 500 to enable portability of vehicle feature subscriptions in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 246, that the user 104 is present in the vehicle 202 based on the inputs obtained from the vehicle's sensor unit. At step 506, the method 500 may include obtaining, by the processor 246, the subscription information associated with the subscription for the premium vehicle feature owned by the user 104 or lent to the user 104 by the user 302, responsive to determining that the user 104 is present in the vehicle 202. At step 508, the method 500 may include changing, by the processor 246, the premium vehicle feature's operational state from an inaccessible state to an accessible state based on the subscription information.

At step 510, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a sensor unit configured to detect a presence of a first user in the vehicle; and a processor configured to:

determine that the first user is present in the vehicle based on inputs obtained from the sensor unit;

obtain information associated with a subscription for a vehicle feature owned by the first user and purchased by the first user for a second vehicle owned by the first user, responsive to determining that the first user is present in the vehicle; and change an operational state of the vehicle feature in the vehicle from an inaccessible state to an accessible state based on the information.

2. The vehicle of claim 1, wherein the processor is further configured to:

keep the vehicle feature in the accessible state until the first user is present in the vehicle;

determine that the first user has exited the vehicle based on the inputs obtained from the sensor unit; and cause the operational state to return to the inaccessible state responsive to determining that the first user has exited the vehicle.

3. The vehicle of claim 2, wherein the vehicle is a rental vehicle, a taxi, or a ride share or hail.

4. The vehicle of claim 1, wherein the information indicates a predefined time duration for which the vehicle feature is to be made accessible in the vehicle, and wherein the processor is further configured to:

cause the vehicle feature to stay in the accessible state for the predefined time duration; and cause the operational state to return to the inaccessible state after the predefined time duration lapses.

5. The vehicle of claim 1, wherein the information indicates a predefined location where the vehicle feature is to be made accessible, and wherein the processor is further configured to:

change the operational state from the inaccessible state to the accessible state when the vehicle enters the predefined location; and cause the operational state to return to the inaccessible state when the vehicle exits the predefined location.

6. The vehicle of claim 1, wherein the vehicle feature is associated with one or more of: an autonomous driving feature, a heated sitting area feature, a massaging sitting area feature, a heated steering wheel feature, an entertainment feature, a social networking feature, enhanced vehicle aerodynamic properties, a premium fuel calibration, an enhanced transmission calibration, an enhanced vehicle stability control, or a vehicle drift mode.

7. The vehicle of claim 1, wherein the sensor unit detects that the first user is present in the vehicle based on facial recognition technology.

8. The vehicle of claim 1, wherein the sensor unit detects that the first user is present in the vehicle by communicatively coupling with a user device associated with the first user.

9. The vehicle of claim 1, wherein the sensor unit detects that the first user is present in the vehicle based on a predefined authentication code obtained by the sensor unit from the first user via a vehicle Human-Machine Interface (HMI) or a user device.

10. The vehicle of claim 1, wherein the processor obtains the information associated with the subscription from a server or a computing device associated with a fleet manager.

11. The vehicle of claim 10, wherein the information comprises an access token to enable the subscription of the vehicle feature at the vehicle, and wherein the processor is configured to change the operational state to the accessible state responsive to obtaining the access token.

12. The vehicle of claim 10, wherein the processor is further configured to:

determine that an application associated with the vehicle feature is not installed in the vehicle responsive to obtaining the information associated with the subscription;

transmit a request to the server to download the application responsive to determining that the application is not installed in the vehicle; and download and install the application on the vehicle responsive to transmitting the request.

13. The vehicle of claim 12, wherein the processor changes the operational state to the accessible state by automatically logging credentials associated with the subscription on the application.

14. The vehicle of claim 10, wherein the vehicle is part of a vehicle fleet, wherein the server is configured to transmit a vehicle feature inaccessible command to a third vehicle of the vehicle fleet responsive to transmitting the information associated with the subscription to the vehicle, and wherein the third vehicle is configured to make the vehicle feature inaccessible in the third vehicle responsive to receiving the vehicle feature inaccessible command from the server.

15. The vehicle of claim 1, wherein the processor obtains the information associated with the subscription from a server, and wherein the server is configured to transmit a vehicle feature inaccessible command to the second vehicle responsive to transmitting the information associated with the subscription to the vehicle, and wherein the second vehicle is configured to make the vehicle feature inaccessible in the second vehicle responsive to receiving the vehicle feature inaccessible command form the server.

16. The vehicle of claim 1, wherein the vehicle is an autonomous taxi, wherein the subscription is associated with an autonomous driving subscription, and wherein the processor is further configured to:

obtain a route information for the vehicle;

determine a destination location and a return location for the vehicle based on the route information;

autonomously move the vehicle to the destination location responsive to determining that the first user is present in the vehicle;

autonomously move the vehicle to the return location from the destination location after the first user exits the vehicle at the destination location; and cause the operational state to return to the inaccessible state when the vehicle is located at the return location.

17. The vehicle of claim 1, wherein the subscription for the vehicle feature is associated with a first vehicle manufacturer, wherein the vehicle is associated with a second vehicle manufacturer, and wherein the first vehicle manufacturer is different from the second vehicle manufacturer.

18. The vehicle of claim 15, wherein the processor is further configured to change the operational state of the vehicle feature in the vehicle from the accessible state to the inaccessible state, wherein the server is configured to transmit a vehicle feature accessible command to the second vehicle responsive to the processor changing the operational state of the vehicle feature in the vehicle from the accessible state to the inaccessible state, and wherein the second vehicle is configured to make the vehicle feature accessible in the second vehicle responsive to receiving the vehicle feature accessible command form the server.

19. A method comprising:

determining, by a processor, that a first user is present in a vehicle based on inputs obtained from a sensor unit, wherein the sensor unit is configured to detect a presence of the first user in the vehicle;

obtaining, by the processor, information associated with a subscription for a vehicle feature owned by the first user and purchased by the first user for a second vehicle owned by the first user, responsive to determining that the first user is present in the vehicle; and changing, by the processor, an operational state of the vehicle feature in the vehicle from an inaccessible state to an accessible state based on the information.

20. A non-transitory computer-readable storage medium having instructions stored thereupon which, when executed by a processor, cause the processor to:

determine that a first user is present in a vehicle based on inputs obtained from a sensor unit, wherein the sensor unit is configured to detect a presence of the first user in the vehicle;

obtain information associated with a subscription for a vehicle feature owned by the first user and purchased by the first user for a second vehicle owned by the first user, responsive to determining that the first user is present in the vehicle; and change an operational state of the vehicle feature in the vehicle from an inaccessible state to an accessible state based on the information.

* * * * *